United States Patent Office 3,382,959
Patented May 14, 1968

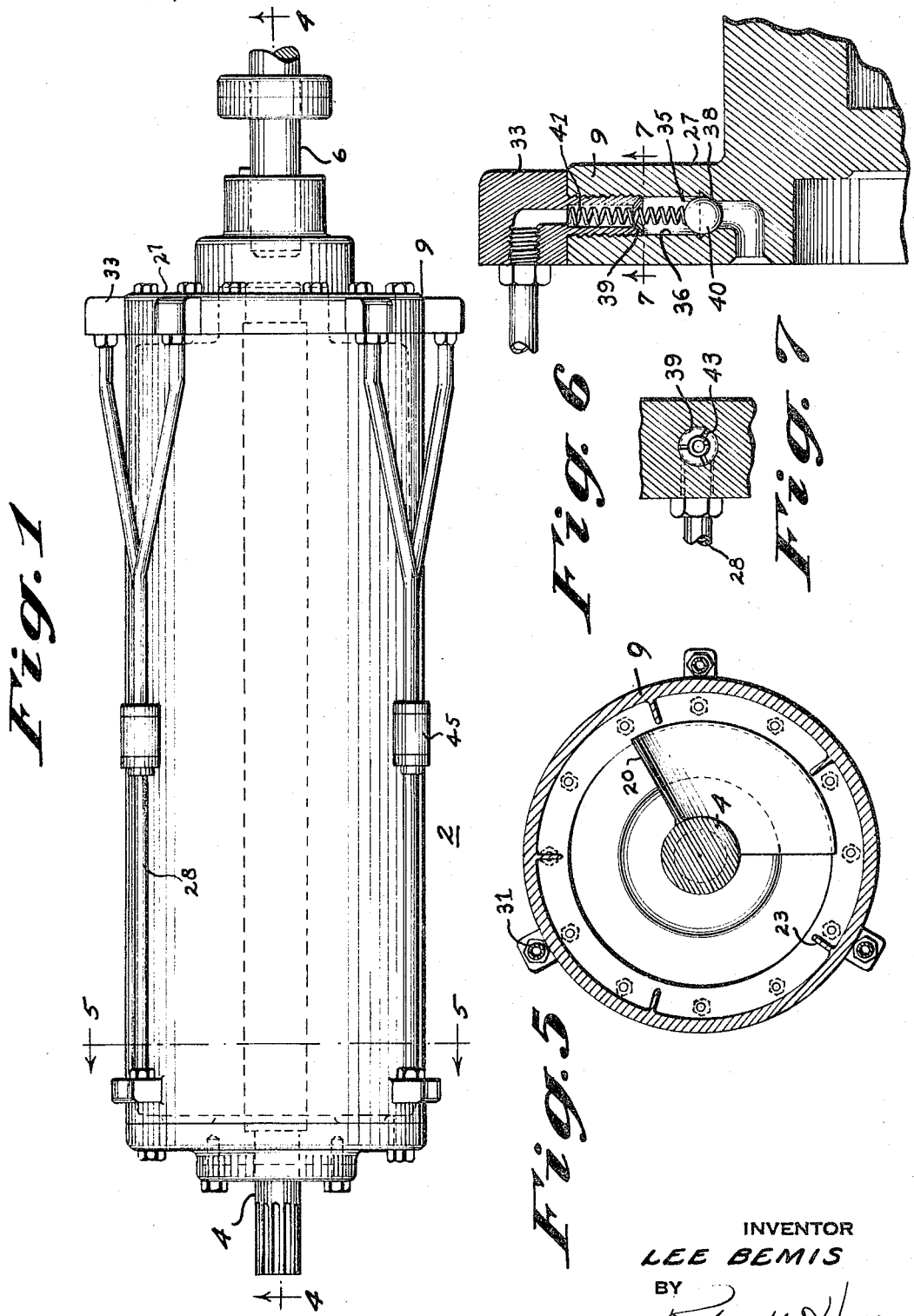

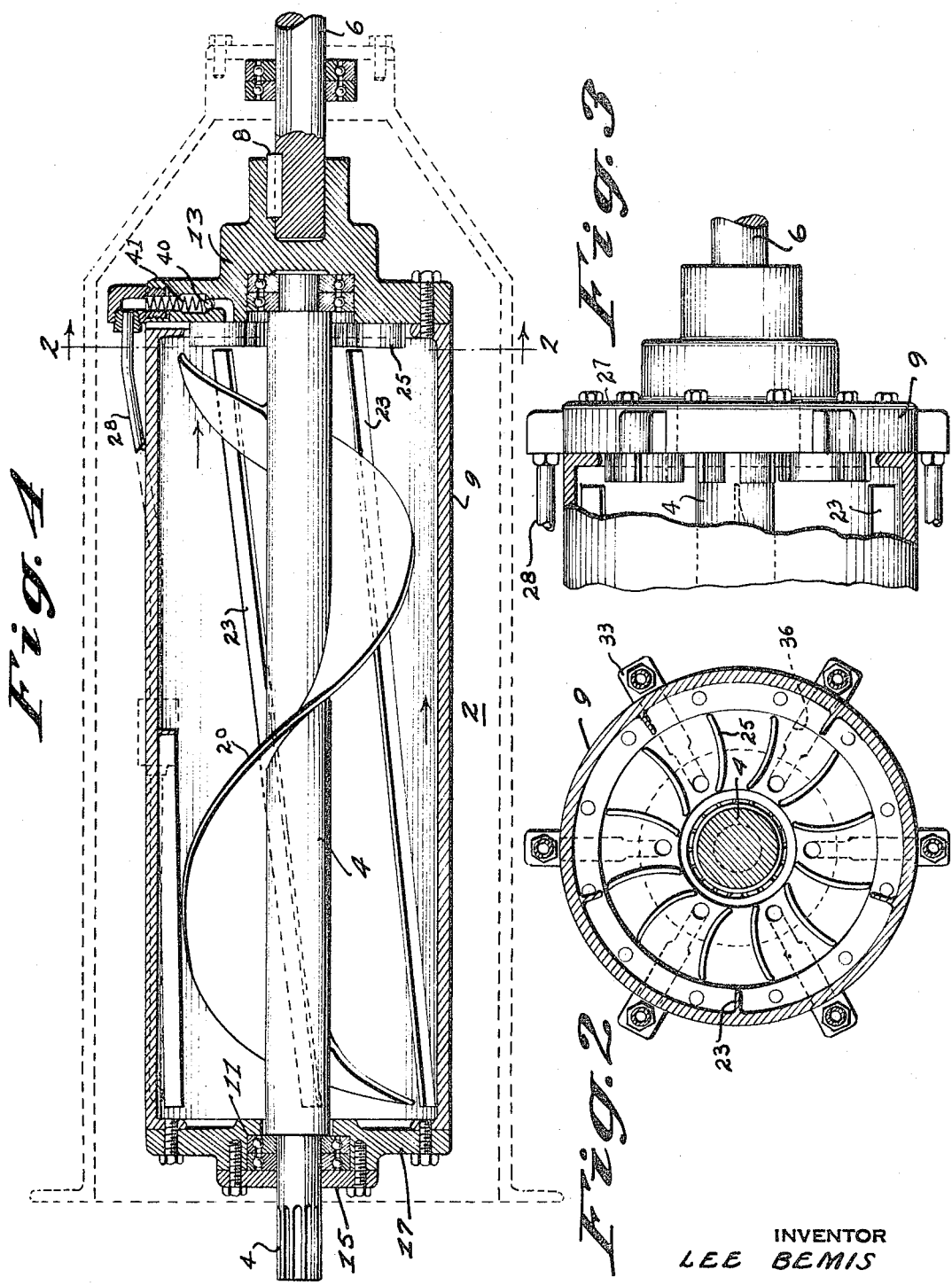

3,382,959
AUTOMATIC VARIABLE FLUID COUPLING
Lee Bemis, El Paso County, Colo.
(1100 Glen Ave., Colorado Springs, Colo. 80905)
Filed Jan. 17, 1966, Ser. No. 521,156
3 Claims. (Cl. 192—58)

ABSTRACT OF THE DISCLOSURE

This invention relates to a fluid transmission having a rotor and stator and provided with a plurality of fluid bypass valves whereby fluid may be bypassed from a high pressure point in the transmission to a lower pressure point in order to effect a change of transmission output speeds.

---

The present invention relates to a power transmission element for transferring energy from a prime mover to a rotatable load. More specifically, the invention comprises a hydraulic coupled transmission having automatically variable means for progressively altering the speed ratio between the input and output of the apparatus.

The primary object of the present invention is to provide a simplified fluid coupled transmission having variable drive ratios which are preferably automatic in their operation but which may be overridden by other speed regulating means or manually.

A preferred form of the invention will be described in detail in connection with the accompanying drawings in which:

FIGURE 1 is a plan view of the coupling showing the input or driving shaft at the left end thereof and the driven or output shaft at the right end thereof.

FIGURE 2 is a cross sectional view taken along lines 2—2 in FIGURE 4.

FIGURE 3 is a fragmentary view of the end of the cylindrical housing with a portion thereof broken away and shown in cross section.

FIGURE 4 is a cross sectional view of the coupling taken along lines 4—4 of FIGURE 1.

FIGURE 5 is a cross sectional view taken along lines 5—5 of FIGURE 1.

FIGURE 6 is an enlarged fragmentary portion of the cross sectional view taken along lines 4—4 in FIGURE 1.

FIGURE 7 is a fragmentary cross sectional view taken along lines 7—7 of FIGURE 6.

Referring first to FIGURES 1 and 4, the transmission, generally identified by reference numeral 2, is seen to include a driving shaft 4, which must be connected to a prime mover (not shown), a driven shaft 6, adapted for connection to a load, and connected by a key 8 to a sealed cylindrical housing 9 containing a liquid, such as oil, which is the coupling medium. The dashed lines of FIGURE 4 illustrate the general outline of a housing cover or frame 8 which may surround the rotatable housing 9 but which does not form any working part of the novel combination. The cylindrical housing 9 is made rotatable with respect to the driving shaft 4 and is carried on the shaft by dual sets of ball bearings 11 and 13 disposed at the ends of the housing.

The bearings 11 on the input end of the housing are retained in place axially by a seal cap 15 screwed to the front drum head 17 of the housing 9. An impeller 20 is formed by a helical vane attached along its inside edge to the driving shaft 4 along the entire length thereof inside the casing 9. The exact design of the impeller 20 may vary depending on the application of the device and other design criteria; in fact the impeller may include a plurality of vanes having greater or less pitch than the one vane 20 illustrated in FIGURE 1.

The purpose and function of the impeller 20 is of course to circulate the fluid within the housing 9 and to impart a driving force to the fluid such as will cause the housing 9 to rotate as a turbine as the fluid gives up its energy to the skew ribs 23 and the rear drum head fins 25. These ribs or blades are respectively disposed along the inside surface of the turbine periphery and around the inside of the rear drum head 27 forming one closed end for the housing 9.

The objective of this, as well as other couplings of a similar nature, is to provide an output speed for the driven shaft 6 which varies with the torque requirements. It is desired that maximum torque be obtained at the output when the ratio of input to output speeds is the greatest. The torque approaches zero as the speed ratio approaches unity. It is an established fact in the art of fluid couplings that recirculation of the fluid from a high to a low pressure area in the coupling will be influential in establishing the speed ratio limits of the converter. The lower limit of the input to output speed ratio can be established by controlling the amount of recirculation of the fluid. With no recirculation the speed ratio may approach unity.

In the preferred form of the present invention an automatic stepping of speed ratio values is obtained by the use of a plurality of spring biased valves which control the flow of fluid through a plurality of conduits 28 interconnecting the high and low pressure ends of the transmission housing and turbine 9. In the illustrations of FIGURES 1 and 5, it may be seen that in the preferred form of the invention the low pressure, or front end of the housing, is provided with three equi-spaced peripheral ports 31 establishing direct unrestricted communication between the inside and outside of the housing 9. To each of the ports 31 is connected a pipe or conduit 28 which is equipped with a bifurcated opposite end so as to permit connection to two valve opening elbows 33 which are screwed into threaded bores in the rear drum head 27. These rear valve elbows 33 are best seen in FIGURES 2 and 6 and are shown to be equi-spaced around the periphery of the housing. Each of the rear drum head valve elbows 33 communicate with the inside of the housing through a ball check valve 35, a typical one of which is shown in detail in FIGURES 6 and 7. Each valve is formed by a radial bore or cavity 35 through the rear drum head 27, said bore having upper and lower ball seats 38 and 39. Between the said two seats within the cavity 35 is disposed a sphere 40 which is biased to a position against the lower seat 38 by a compression spring 41, the upper end of which abuts against the elbow 33. Of the six springs 41 there may preferably be three pairs having three different characteristics, that is one pair being the weakest while the other two pair are respectively stronger. Each of the springs shall be so selected and designed that a given pressure on the ball 40 will compress the spring to such a position that the ball 40 will remain between the seats 38 and 39 of the valve allowing fluid to pass therethrough. After the application to the ball 40 of a given greater pressure, the spring will be further compressed to allow the ball 40 to be seated in the upper valve seat 39 and thus close off the fluid flow into the conduit 28 except for such small amount as flows through the relief grooves 43 in the upper seat 39. In addition to the automatic valving provided as set forth above, each of the conduits 28 is provided with a solenoid valve 45 of a type well known in the art. Each of the valves can be manually operated to close the conduits 28, obtaining the same result as when the balls 40 are seated by the hydraulic pressure in the upper valve seats 39.

In operation, as the input, or driving shaft speed increases from zero the hydraulic pressure at the rear drum head 27 increases to a point at which the six ball check valves 35 open, that is ball 40 is removed from the lower seat 38, allowing fluid to circulate into all of the bypass conduits 28. This complete recirculation of fluid limits the speed of the driven shaft to a low value. Further increase in the input shaft speed however increases the hydraulic pressure to the level necessary to close two of the balls 40 against their upper seats 39, restricting recirculation to only two-thirds of that originally present. Such limitation of recirculation increases the output speed. Similar and further increases in input speed operate to successively close all of the check valves, providing an approach to unity speed ratio and maximum output speed for the driven shaft 6. It will be apparent that the output shaft speed itself is, to some extent, responsible for the closing of the ball check valves. The centrifugal force created by the rotation of the housing 9 tends to force the balls 40 radially outward and assists in closing the valve. By proper selection of the springs 41 the effect of sudden increases in input speed can be controlled so as not to suddenly close the valves and jerk the driven shaft to a higher speed. This is possible of course if the output speed is itself one of the factors causing the ball check valves to close.

Another of the desirable features of the present invention is the advantages gained by the braking action of the transmission when the speed of the driving shaft 4 is reduced to less than the speed of the output shaft 6. Under this condition the hydraulic fluid tends to be pumped in the reverse direction, however the possibility of recirculation is eliminated under these conditions on account of the closing of the balls 40 on the bottom seats 38 of the valves 35 due to the reverse pressure drop across the valves. Without recirculation the hydraulic coupling provides maximum drag and braking action to the driven shaft 6.

I claim:

1. A power transmission element comprising in combination;

pump means including a driving shaft having vane means attached thereto, said vane means comprising at least one helically shaped member connected along its inside edge to the said shaft and extending lengthwise of said shaft;

a turbine member surrounding said vane means and rotatably mounted with respect to said driving shaft and having blade means rigidly attached to the inside of said turbine member;

hydraulic fluid contained inside said turbine; and conduit means including at least one ball check valve connected to said turbine member and establishing communication between two separated points on said turbine member, said conduit means interconnecting points on said turbine which are spaced apart by the length of said helical vane.

2. The transmission of claim 1 wherein each of said ball check valves includes a cavity whose longitudinal axis is radially disposed to said shaft and tubular means interconnecting the said cavity with the conduit means and with the interior of said turbine, a check ball contained within said cavity, means forming seats for said ball at each end of said cavity; and a compression spring member disposed within said cavity and biasing said check ball toward said shaft.

3. The transmission of claim 2 wherein second valve means are connected in series with said ball check valves in said conduit means.

References Cited

UNITED STATES PATENTS

| | | | |
|---|---|---|---|
| 1,940,918 | 12/1933 | Petroni et al. | 192—58 |
| 2,337,609 | 12/1943 | Jamieson | 192—58 |
| 2,466,431 | 4/1949 | Jendresen | 192—58 |
| 2,510,225 | 7/1950 | Hindmarch | 192—58 |

FOREIGN PATENTS

| | | |
|---|---|---|
| 16,785 | 1912 | Great Britain. |

EDGAR W. GEOGHEGAN, *Primary Examiner.*